United States Patent
Richmond, Jr. et al.

(10) Patent No.: US 11,846,947 B2
(45) Date of Patent: Dec. 19, 2023

(54) SYSTEMS AND METHODS FOR AN IMPLEMENT IMAGING SYSTEM

(71) Applicant: CNH Industrial Canada, Ltd., Saskatoon (CA)

(72) Inventors: Jerome Richmond, Jr., Aurora, IL (US); Trevor L. Kowalchuk, Saskatoon (CA); Anthony Charles Rapley, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 394 days.

(21) Appl. No.: 17/317,428

(22) Filed: May 11, 2021

(65) Prior Publication Data
US 2022/0365538 A1 Nov. 17, 2022

(51) Int. Cl.
G05D 1/02 (2020.01)
G06V 20/13 (2022.01)
G06V 20/58 (2022.01)
G06V 20/52 (2022.01)
B60R 11/04 (2006.01)
B60R 1/20 (2022.01)

(52) U.S. Cl.
CPC ............ *G05D 1/0214* (2013.01); *B60R 1/20* (2022.01); *B60R 11/04* (2013.01); *G06V 20/13* (2022.01); *G06V 20/52* (2022.01); *G06V 20/58* (2022.01); *B60R 2300/105* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 9,854,209 B2 | 12/2017 | Aich et al. | |
| 10,292,321 B2 | 5/2019 | Neitemeier et al. | |
| 10,336,255 B2 | 7/2019 | Lynam | |
| 10,491,818 B2 | 11/2019 | Matsuzaki | |

(Continued)

FOREIGN PATENT DOCUMENTS

| | | |
|---|---|---|
| WO | WO 2015/049847 | 4/2015 |
| WO | WO 2016/068185 | 5/2016 |
| WO | WO 2019/091725 | 5/2019 |

OTHER PUBLICATIONS

US 10,363,873 B2, 07/2019, Matsuzaki (withdrawn)

*Primary Examiner* — Ricky Chin
(74) *Attorney, Agent, or Firm* — Rebecca Henkel; Rickard DeMille

(57) ABSTRACT

In one aspect, a system for an agricultural application includes an implement including a frame. The frame includes a center frame section and at least one movable frame section. A first imaging device is installed on the movable frame section. A second imaging device is installed inboard of the movable frame section relative to the center frame section in the unfolded position. A computing system is communicatively coupled to the first imaging device and the second imaging device. When the implement is in the unfolded position, the computing system receives image data associated with an imaged environment outward of the implement from the first imaging device. When the implement is in the folded position, the computing system receives image data associated with an imaged environment outward of the implement from the second imaging device.

20 Claims, 9 Drawing Sheets

(56) References Cited

U.S. PATENT DOCUMENTS

| | | | |
|---|---|---|---|
| 10,594,934 B2 | 3/2020 | Li et al. | |
| 10,668,854 B2 * | 6/2020 | Imaizumi | E02F 9/264 |
| 11,212,964 B2 * | 1/2022 | Bhavani | A01D 46/30 |
| 2006/0072008 A1 * | 4/2006 | Miyazaki | B60R 11/04 |
| | | | 348/118 |
| 2006/0130593 A1 * | 6/2006 | Richards | G01V 3/15 |
| | | | 73/856 |
| 2010/0171828 A1 * | 7/2010 | Ishii | B62D 15/0275 |
| | | | 348/135 |
| 2016/0005319 A1 * | 1/2016 | Cros | H04N 7/18 |
| | | | 701/3 |
| 2016/0200252 A1 * | 7/2016 | Oota | E02F 9/2033 |
| | | | 348/148 |
| 2019/0317521 A1 | 10/2019 | Nishi et al. | |
| 2019/0389382 A1 | 12/2019 | Nishii | |
| 2020/0150848 A1 * | 5/2020 | Deng | G06T 15/205 |
| 2020/0231210 A1 * | 7/2020 | Anderson | B62D 15/0295 |
| 2020/0290635 A1 * | 9/2020 | Stanhope | A01B 73/065 |
| 2021/0104099 A1 * | 4/2021 | Skelly | G06F 3/04815 |
| 2021/0402925 A1 * | 12/2021 | Berne | B60R 1/00 |
| 2022/0001802 A1 * | 1/2022 | Berne | B60R 11/0229 |
| 2022/0012494 A1 * | 1/2022 | Butterfield | G06V 20/58 |
| 2022/0032858 A1 * | 2/2022 | LaCross | H04N 23/50 |
| 2022/0161726 A1 * | 5/2022 | Choi | B60R 1/12 |
| 2022/0258672 A1 * | 8/2022 | Peterson | B60R 11/04 |
| 2022/0365538 A1 * | 11/2022 | Richmond, Jr. | G05D 1/0214 |
| 2023/0211740 A1 * | 7/2023 | LaCross | B60R 1/12 |
| | | | 348/148 |
| 2023/0215048 A1 * | 7/2023 | Ostrowski | G06T 7/85 |
| | | | 348/47 |

* cited by examiner

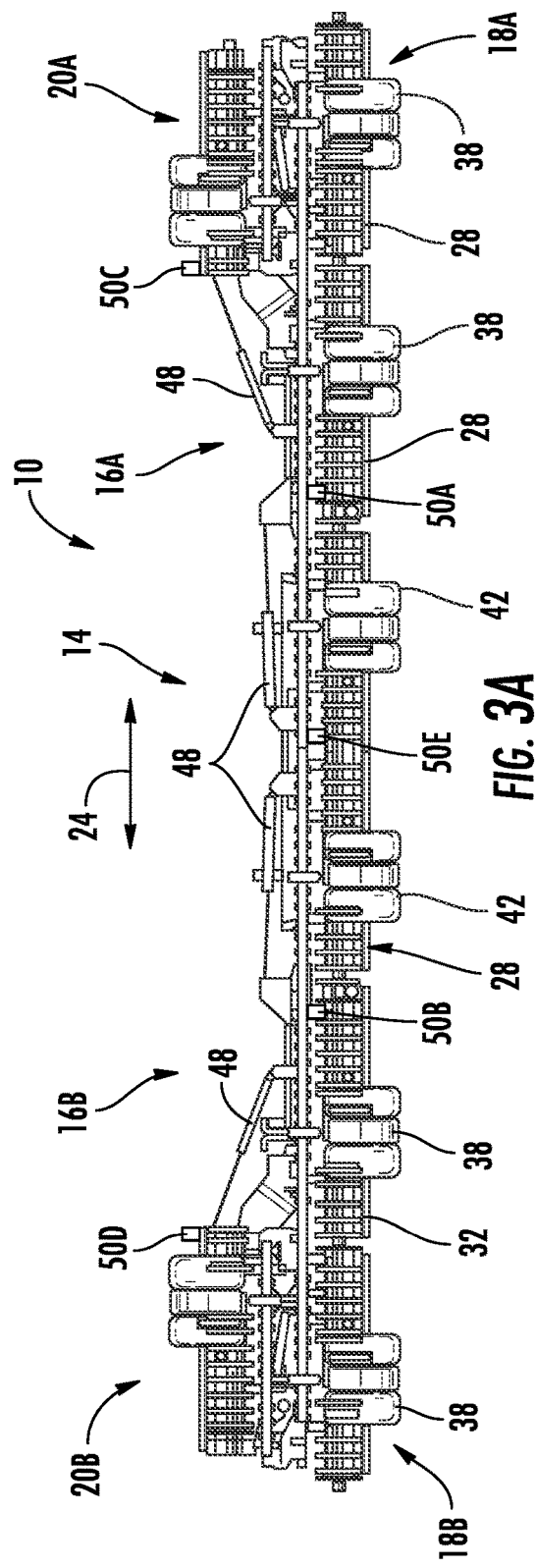
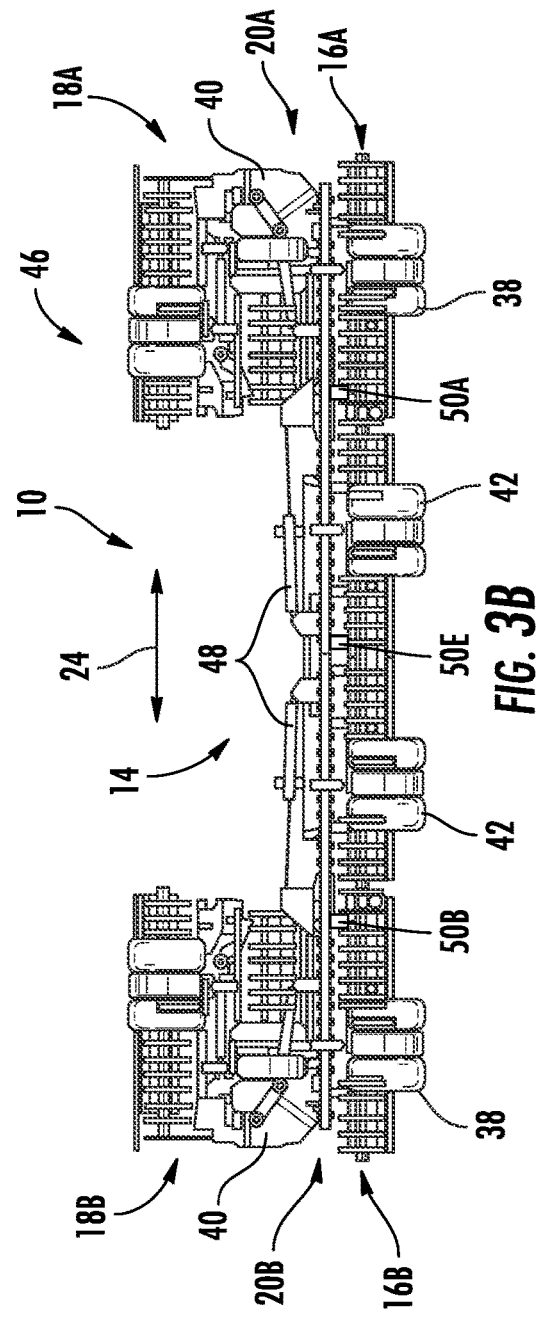

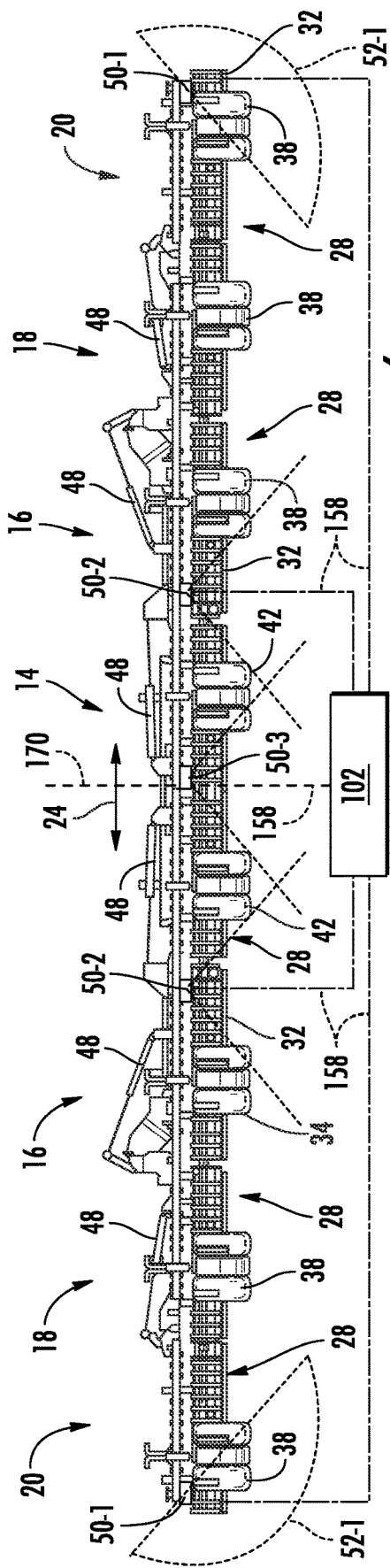
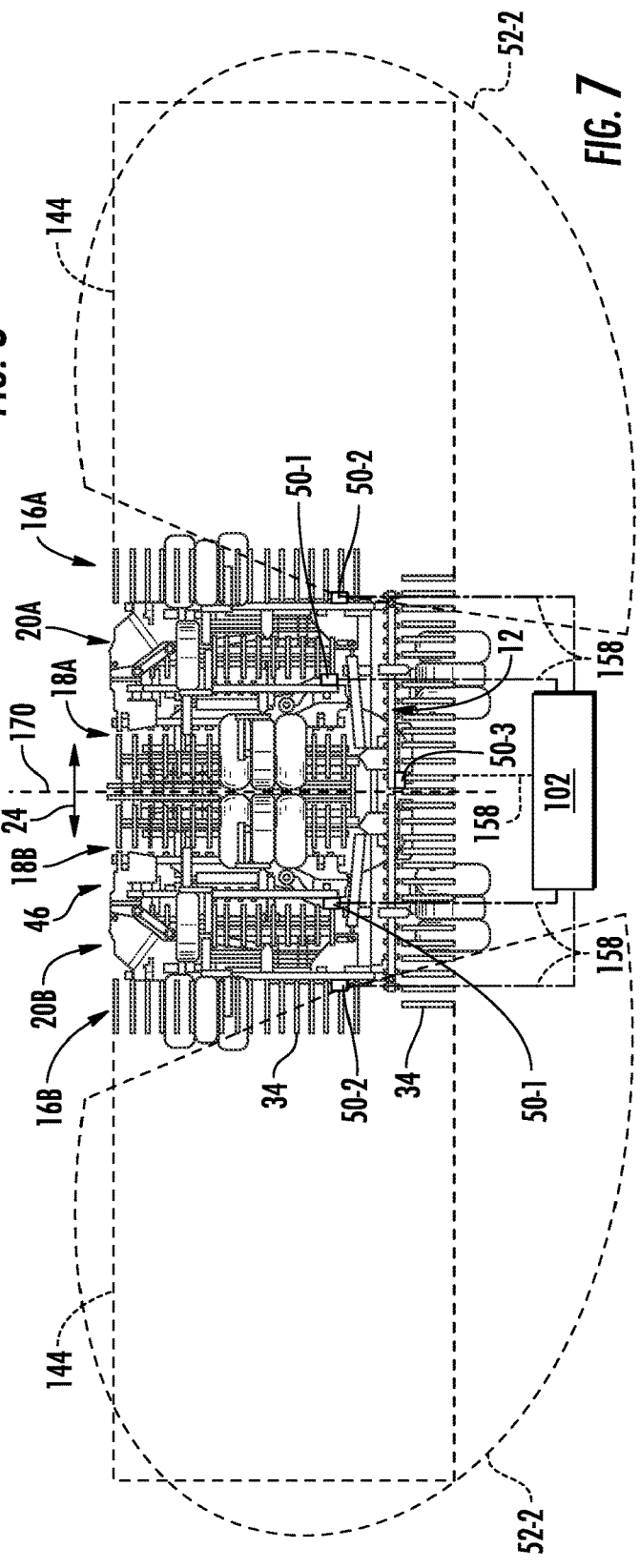

SYSTEMS AND METHODS FOR AN IMPLEMENT IMAGING SYSTEM

FIELD OF THE INVENTION

The present subject matter relates generally to a vision-based system for an implement and, more particularly, to related methods for a vision-based system to provide additional visibility while the implement is in use.

BACKGROUND OF THE INVENTION

Agricultural vehicles, such as work vehicles, agricultural implements, and/or the like, often include a plurality of sensors for collecting data associated with the operation of the agricultural vehicle. For example, an agricultural vehicle may include sensors used to gather field condition data or other data related to one or more operating parameters of the agricultural vehicle as it performs an agricultural operation within a field. However, these sensors typically correspond to single-function sensors that are dedicated solely to the detection of a specific work-related operating parameter. As a result, if it is desired to detect one or more other parameters related to the operation of the agricultural vehicle, an additional sensor(s) or sensing devices may be installed on the vehicle. Unfortunately, these single-function sensors increase the cost-per-feature of integration into an agricultural vehicle.

Accordingly, a system and method for collecting data associated with the operation of an agricultural vehicle in different operating positions through one or more imaging devices would be welcomed in the technology.

BRIEF DESCRIPTION OF THE INVENTION

Aspects and advantages of the invention will be set forth in part in the following description, or may be obvious from the description, or may be learned through practice of the invention.

In some aspects, the present subject matter is directed to a system for an agricultural application. The system includes an implement including a frame. The frame includes a center frame section and at least one movable frame section. A movement system is configured to pivot the at least one movable frame section relative to the center frame section between a folded position and an unfolded position. A first imaging device is installed on the movable frame section. A second imaging device is installed inboard of the movable frame section relative to the center frame section in the unfolded position. A computing system is communicatively coupled to the first imaging device and the second imaging device. The computing system includes a processor and associated memory. The memory stores instructions that, when implemented by the processor, configure the computing system to when the implement is in the unfolded position, receive, from the first imaging device, image data associated with an imaged environment laterally outward of the implement and when the implement is in the folded position, receive, from the second imaging device, image data associated with the imaged environment outward (e.g., laterally, forward, and/or rearward) of the implement.

In some aspects, the present subject matter is directed to a method of generating an image of an implement. The implement includes a frame having a center frame section and at least one movable frame section pivotable relative to the center frame section between a folded position and an unfolded position. The method includes detecting, with a computing system, whether the implement is in the folded position or the unfolded position. When the implement is in the unfolded position, the method includes receiving, from a first imaging device, image data associated with an imaged environment outward of the implement. When the implement is in the folded position, the method includes receiving, from a second imaging device, image data associated with the imaged environment outward of the implement, the second imaging device positioned inboard of the first imaging device in the unfolded position.

In some aspects, the present subject matter is directed to a method of generating an image of an implement. The implement includes a frame having a center frame section and at least one movable frame section pivotable relative to the center frame section between a folded position and an unfolded position. The method includes receiving, from a first imaging device, image data associated with an imaged environment proximate to the implement. The method also includes determining, with a computing system, whether the movable frame section is in the unfolded position or the folded position based on the image data received from the first imaging device. When the implement is in the unfolded position, the method includes receiving, from a first imaging device, image data associated with an imaged environment outward of the implement. When the implement is in the folded position, the method includes receiving, from a second imaging device, image data associated with the imaged environment outward of the implement, the second imaging device positioned inboard of the first imaging device in the unfolded position.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3A and 3B illustrate front views of an agricultural implement during a folding operation in accordance with aspects of the present subject matter;

FIG. 6 illustrates a front view of an agricultural implement in the unfolded position having a plurality of imaging devices attached thereto in accordance with aspects of the present subject matter;

FIG. 7 illustrates a front view of the agricultural implement in the folded position having the plurality of imaging devices attached thereto in accordance with aspects of the present subject matter;

DETAILED DESCRIPTION OF THE INVENTION

Figure 1:
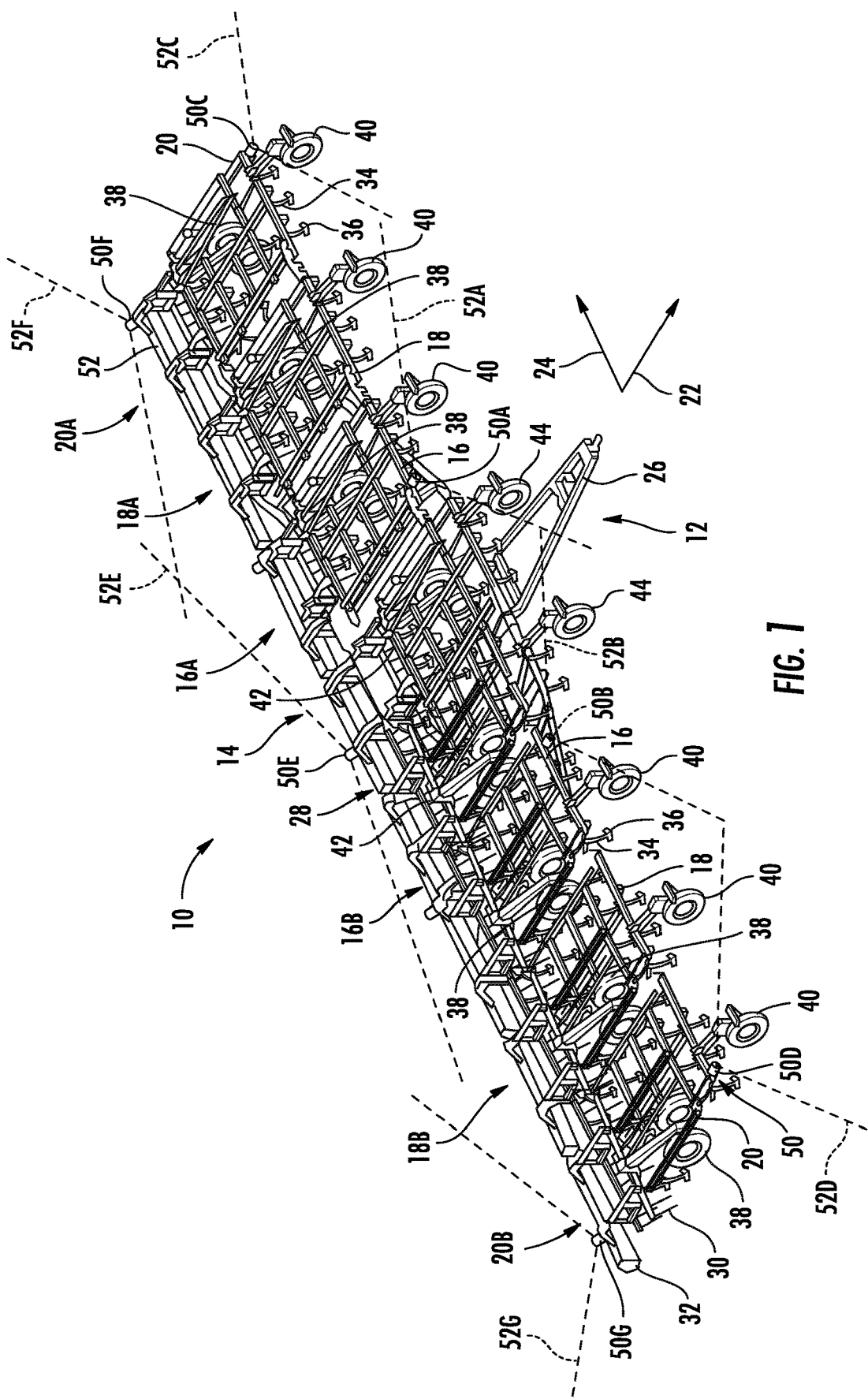
FIG. 1 illustrates a perspective view of an agricultural implement in an operating position in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In general, the present subject matter is directed to systems and methods for imaging an environment surrounding an agricultural implement. In some embodiments, the implement includes a frame having a center frame section and at least one movable frame section. A first imaging device is installed on the movable frame section. A second imaging device is installed inboard of the movable frame section relative to the center frame section in the unfolded position. A computing system is communicatively coupled to the first imaging device and the second imaging device. When the implement is in the unfolded position, the computing system receives image data associated with an imaged environment outward (e.g., laterally, forward, and/or rearward) of the implement from the first imaging device. In some instances, the image data associated with an imaged environment outward of the implement may capture the area behind the implement. When the implement is in the folded position, the computing system receives image data associated with an imaged environment outward (e.g., laterally, forward, and/or rearward) of the implement from the second imaging device.

In accordance with aspects of the present subject matter, the disclosed systems and methods utilize computer vision techniques and/or image processing algorithms to generate information related to the use of the implement. The information may be notifications based on the image data generated by the system and/or various views, such as an aerial view, that provides a user of the implement improved visibility due to the size of the implement and the various positions that the implement may be placed in. For instance, when the implement is in an unfolded position, the large width can make maneuvering the implement difficult. Similarly, when the implement is in a folded position, the height of the implement can make maneuvering the implement difficult. The systems and methods provided herein assist in solving each of these issues, which in turn, may increase the work output of the vehicle due to the ability to operate confidently at faster speeds.

Figure 2:
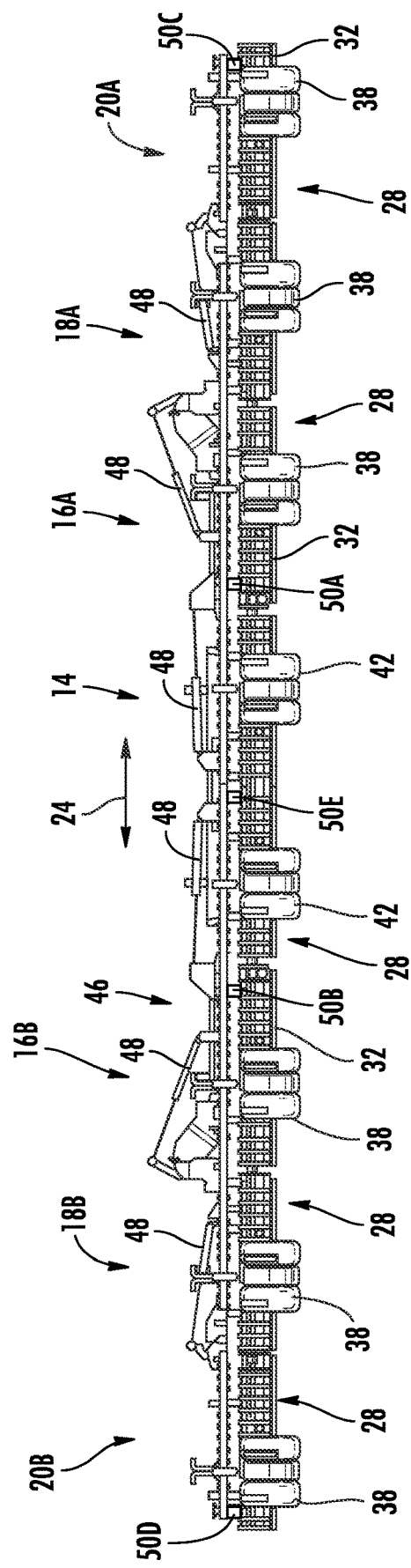
FIG. 2 illustrates a front view of an agricultural implement in an unfolded, operating position in accordance with aspects of the present subject matter.

Referring to FIGS. 1 and 2, a perspective view and a front view of an agricultural implement 10 are respectively illustrated in accordance with aspects of the present subject matter. As illustrated, the implement 10 may be configured as a field cultivator, for example, a multi-section field cultivator. It will be appreciated that while a multi-section field cultivator is described herein, the implement may be configured as any other type of implement without departing from the scope of the present disclosure. For example, the implement may alternatively be configured as a front fold planters, pivot planters, rear folding seeding equipment, and/or any other type of implement.

The multi-section field implement 10 may include a frame 12 having a center frame section 14 and one or more movable frame sections 16, 18, 20. The frame 12 may include beams, bars, and/or the like. In some embodiments, the frame 12 may be foldable from an unfolded position (e.g., operating position), for example as illustrated in FIGS. 1 and 2, to a folded position (e.g., transport position), as explained in greater detail below.

In some embodiments, the field implement 10 may have a triple-fold configuration with three left movable sections 16A, 18A, 20A, and three right movable frame sections 16B, 18B, 20B. Each of the movable frame sections 16A, 16B, 18A, 18B, 20A, 20B may be movable relative to one another 16A, 16B, 18A, 18B, 20A, 20B and/or to the center frame section 14. The movable frame sections may include inner movable frame sections 16A,16B, middle wing frame sections 18A,18B, and movable frame sections 20A, 20B. In other embodiments, however, the field implement 10 may only have two movable frame sections on each side of the center frame section 14. In yet other embodiments, the field implement 10 may have a single movable frame section on each side of the center frame section 14. In yet further embodiments, the field implement 10 may have greater than three movable frame sections on each side of the center frame section 14.

Referring still to FIGS. 1 and 2, in some embodiments, the center frame section 14 may be towed by a work vehicle 54 (FIG. 5), such as an agricultural tractor, in a direction of travel 22. The implement 10 may generally extend in a lateral direction 24 perpendicular to the direction of travel 22. In some embodiments, a pull hitch 26 may extend forward from the center frame section 14 and be coupled with the work vehicle 54.

The frame 12 may be configured to support, or otherwise connect with, a plurality of components. For example, in some embodiments, the implement 10 may include one or more rear auxiliary implements 28, such as a spring tooth drag 30 and/or rolling basket 32. The rear auxiliary implements 28 may be configured to finish the soil. In other embodiments, the rear auxiliary implements 28 can include a spike tooth drag, cultivator shanks, etc. In some embodiments, the implement 10 may not include the rear auxiliary implement 28 whatsoever. The implement 10 may additionally or alternatively include a plurality of ground-engaging tools 34 pivotally mounted to the frame 12. For example, cultivator shanks 34 may be pivotally mounted to the center frame section 14 and at least one of the movable frame sections 16, 18, 20. The cultivator shanks 34 may include tip ends 36 at their lower ends for tilling the soil. The tip ends 36 may be configured as shovels, for example.

The implement 10 may include a plurality of lift wheels, configured to support the implement 10 with respect to a ground surface. For example, the implement 10 may include movable lift wheels 38, 40 connected with the movable frame sections 16, 18, 20 and center lift wheels 42, 44 connected with the center frame section 14. The movable lift wheels 38, 40 may include rear movable lift wheels 38 and front movable lift wheels 40. The center lift wheels 42, 44 may also include rear center lift wheels 42 and front center lift wheels 44.

In some embodiments, the implement 10 may include a movement system 46 including a plurality of actuators, such as wheel actuators, implement actuators, and/or folding actuators 48. For example, the wheel actuators may be configured to raise and lower the plurality of lift wheels relative to the frame 12 such that the frame 12 is raised and lowered relative to the ground surface. The implement actuators may be configured to pivot the plurality of ground-engaging tools away from the ground surface from a ground-engaging position to a retracted position. The folding actuators 48 may be configured to fold the movable frame sections 16, 18, 20 of the frame 12 relative to the center frame section 14.

Figure 4:
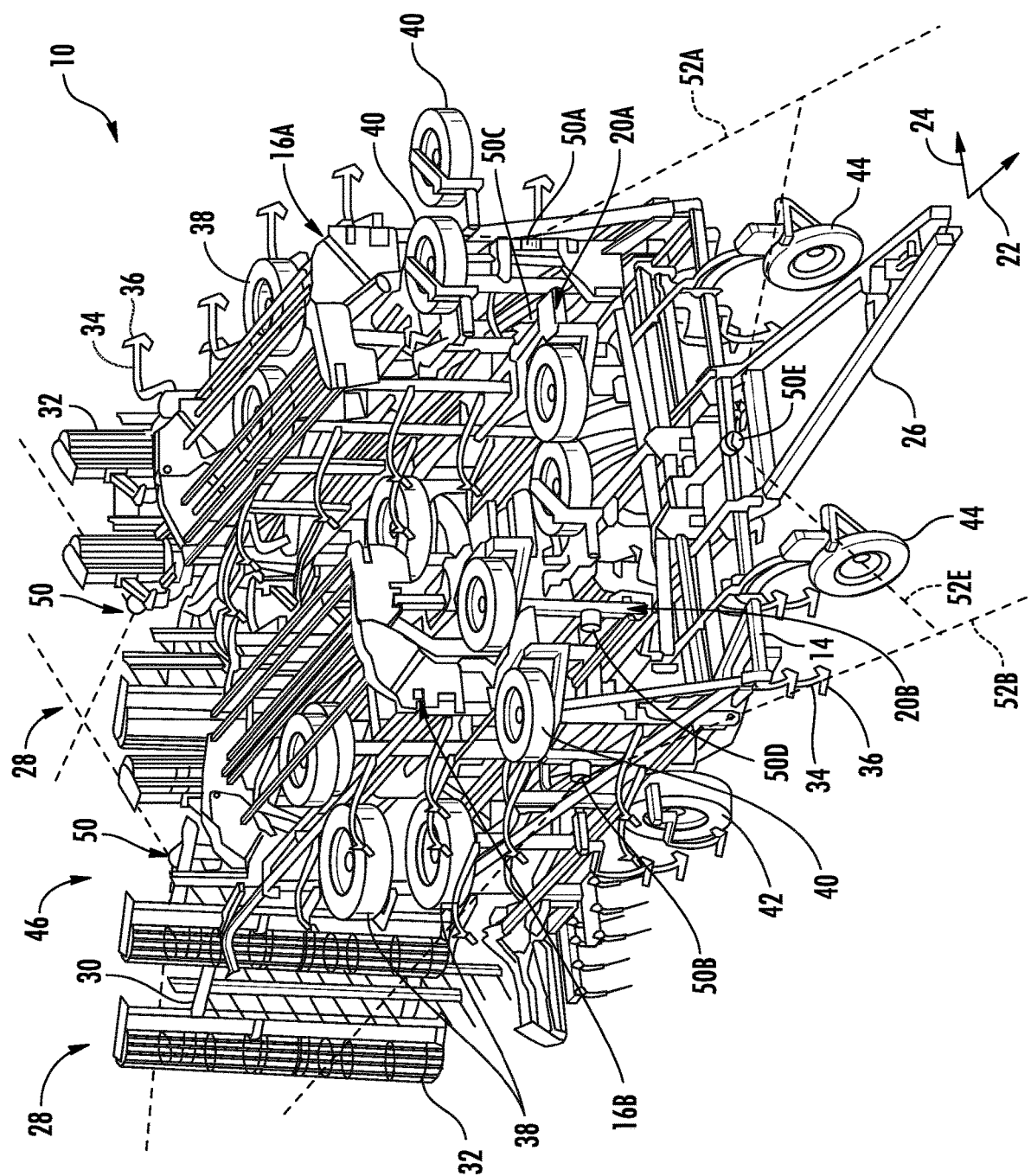
FIG. 4 illustrates a perspective view of an agricultural implement in a folded, transport position in accordance with aspects of the present subject matter.

As indicated above, the implement 10 may be foldable from an operating (unfolded) position, for example as illustrated in FIGS. 1 and 2, to a transport (folded) position. Referring to FIG. 3A, first, each movable section 20A and 20B may be folded approximately laterally inward and over a respective middle movable section 18A and 18B. Referring to FIG. 3B, with the movable frame sections 20A and 20B in the folded state, each middle movable section 18A and 18B may be folded laterally inward and over a respective inner movable section 16A and 16B. Referring to FIG. 4, with the middle movable frame sections 18A and 18B in the folded state, each inner movable section 16A and 16B may be folded laterally inward and over the center frame section 14. The movable frame sections 20, middle movable frame sections 18, and inner movable frame sections 16 may stack together in a horizontally arranged stack over the center frame section 14 when in the folded state. When in the folded state, the movable frame sections 20 may be positioned between a respective middle movable section 18 and inner movable section 16. To unfold the field implement 10 and transform back to the field or operating position, for example as illustrated in FIGS. 1 and 2, the folding sequence described above may be reversed.

It should also be appreciated that the configuration of the implement 10 described above and shown in FIGS. 1-4 is only provided for exemplary purposes. Thus, it should be appreciated that the present subject matter may be readily adaptable to any manner of implement configuration. For example, as indicated above, the one or more frame sections 14, 16, 18, 20 of the implement 10 may be configured to support any suitable type of implement 10. Moreover, it should be appreciated that any of the one or more frame section 14, 16, 18, 20 may move in any direction relative to one another without departing from the scope of the present disclosure. For example, in instances in which the implement 10 is configured as a front fold toolbar planters, one or more movable frame sections may fold ninety degrees toward the front of the planter. In instances in which the implement 10 is configured as a pivot planter, the one or more movable frame sections can rotate ninety degrees from a transport position in which the one or more movable frame sections are generally parallel in orientation to the main bar to a deployed planting position in which the one or more movable frame sections are generally perpendicular to the main bar. Further, in instances in which the implement 10 is a stacker planter, the one or more frame sections may be configured as gull wings that fold upward and inward but do not change their angular relationship to the main bar between a folded position and an unfolded position.

Additionally, in accordance with aspects of the present subject matter, the implement 10 may include one or more imaging devices 50 coupled thereto and/or supported thereon for capturing images or other image data associated with a surrounding environment proximate to the implement 10. In general, the imaging devices 50 may correspond to any suitable devices configured to capture images or other image data of the field that allow the environment surrounding the implement 10. For instance, in several embodiments, the imaging devices 50 may correspond to any suitable cameras, such as single-spectrum camera or a multi-spectrum camera configured to capture images in the visible light range and/or infrared spectral range. Additionally, in some embodiments, the cameras may correspond to a single lens camera configured to capture two-dimensional images or a stereo camera having two or more lenses with a separate image sensor for each lens to allow the cameras to capture stereographic or three-dimensional images. Alternatively, the imaging devices 50 may correspond to any other suitable image capture devices and/or vision systems that are capable of capturing "images" or other image-like data that allow the environment surrounding the implement 10.

In various embodiments, one or more of the imaging devices 50 may be configured to capture image data associated with the operation of the implement 10 within its operating (unfolded) position and its transport (folded) position. For instance, when in the operating position, a first imaging device 50 or set of first imaging devices 50 may be configured to capture image data associated with one or more work-related parameters that relate to the performance of the corresponding agricultural operation within the field, such as one or more field conditions or parameters (e.g., the contour of the ground, surface roughness, rock/stone detection, etc.), one or more crop conditions (e.g., distance to the crop canopy, the location of crop rows, residue flow, residue plugs, etc.), and/or monitor an area surrounding the implement 10. Further, the one or more of the imaging devices 50 may be utilized during in-field steering when using an implement 10 that supports in-field steering on a gradient in a field.

Similarly, when operating in the transport position, a second imaging device 50 or a second set of imaging devices 50 may be configured to capture image data associated with one or more transport-related parameters that relate to transporting the implement 10 between separate locations. The transport-related parameters may include environmental feature detection/avoidance, road edge recognition, highway lane detection, and the like. It will be appreciated that the environmental features may be located in front of, behind, and/or to the sides of the implement 10 as it is being backed up or turned. In various embodiments, at least one imaging device 50 from the first set of imaging devices 50 may be actuated differently from the second set of imaging devices 50 while each of the remaining imaging devices 50 may be within the first set of imaging devices 50 and the second set of imaging devices 50. By configuring each imaging device 50 to perform separate functions depending on the operating position of the implement 10 (e.g., field condition detection in the operating (unfolded) position and obstacle detection in the transport position), the imaging devices 50 may provide increased functionality at a reduced cost-per-feature as compared to conventional systems that require separate sensors to provide such functionality.

It should be appreciated that the implement 10 may include any number of imaging devices 50 provided at any suitable location that allows images of the field to be captured as the implement 10 is in motion. For instance, FIGS. 1-4 illustrate examples of various locations for mounting one or more imaging devices 50 for capturing images of the field. Specifically, as shown in FIG. 1, in various embodiments, a port side inner movable imaging device 50A may be coupled to a front portion of the port side inner movable frame section 16A and a starboard side inner movable imaging device 50B may be coupled to a front portion of the starboard side inner movable frame section 16B. The port side inner movable imaging device 50A and the starboard side inner movable imaging device 50B may have respective fields of view 52A, 52B that allow each imaging device 50A, 50B to capture images of an adjacent area or portion of a surrounding environment that is disposed in front of, above, and/or below the implement 10.

Similarly, in some embodiments, a port side movable imaging device 50C may be coupled to a front portion of the port side movable frame section 20A and a starboard side movable imaging device 50D may be coupled to a front portion of the starboard side movable frame section 20B. The port side movable imaging device 50C and the starboard side movable imaging device 50D may have respective fields of view 52C, 52D that allow each imaging device to capture images of an adjacent area or portion of a surrounding environment that is outward (e.g., laterally, forward, and/or rearward) of the implement 10.

Further, in some embodiments, a central imaging device 50E may be coupled to the center frame section 14, a port side movable imaging device 50F may be coupled to a rear portion of the port side movable frame section 20A, and a starboard side movable imaging device 50G may be coupled to a rear portion of the starboard side movable frame section 20B. The rear center frame section imaging device 50E, the rear port side movable imaging device 50F, and the rear starboard side inner movable imaging device 50G may have respective fields of view 52E, 52F, 52G that allow each imaging device 50E, 50F, 50G to capture images of an adjacent area or portion of a surrounding environment that is disposed below, above, and/or outward (e.g., laterally, forward, and/or rearward) of the implement 10. It should be appreciated that, in alternative embodiments, the imaging devices 50A-G may be installed at any other suitable location that allows the imaging devices 50A-G to capture images of the environment surrounding the implement 10. It will be appreciated that any of the imaging devices 50A-G described herein may be positioned at any other position in a fore/aft direction and/or a lateral direction 24 without departing from the scope of the present disclosure.

Figure 5:
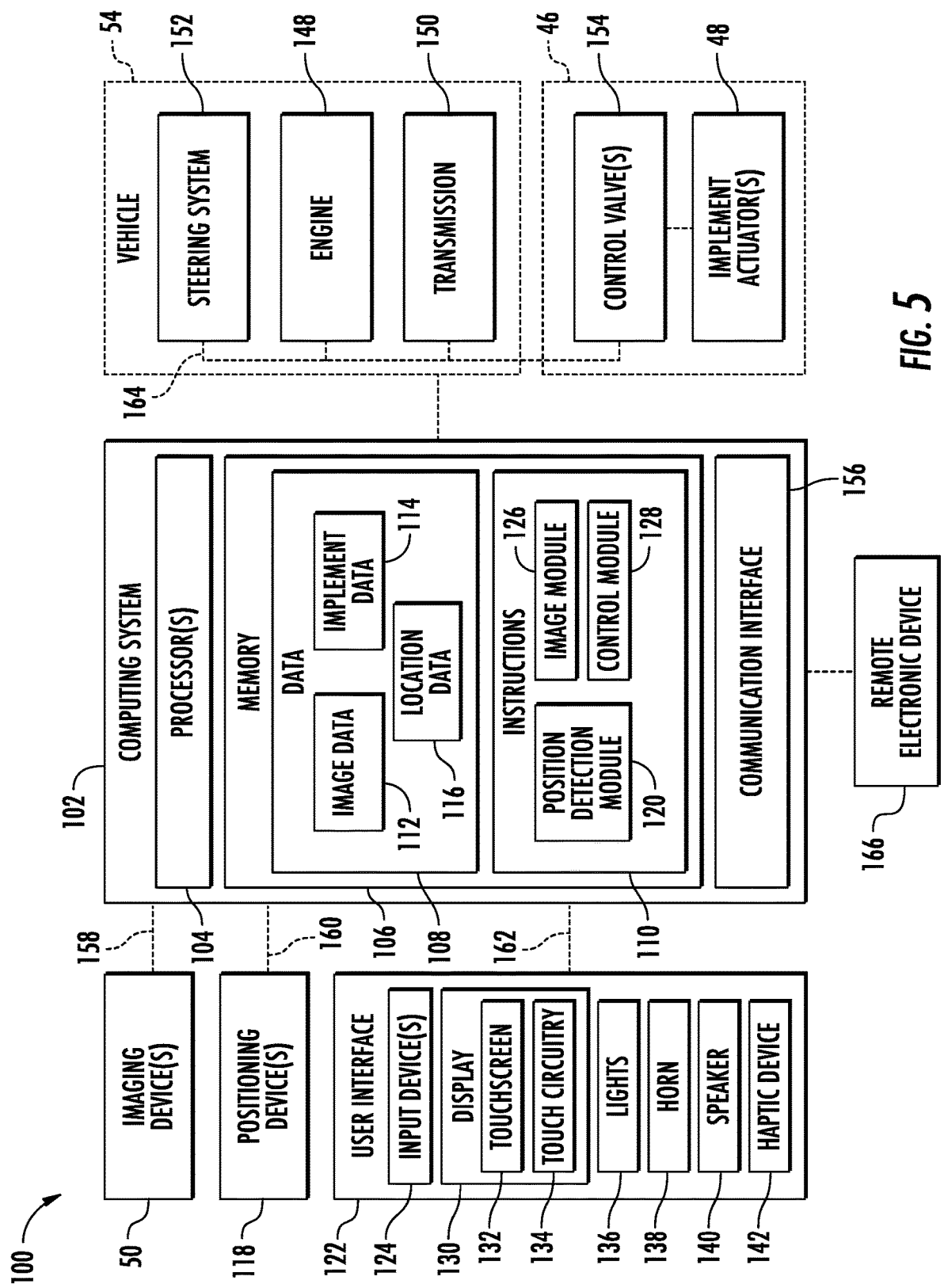
FIG. 5 illustrates a schematic view of a system for an agricultural implement in accordance with aspects of the present subject matter.

Referring now to FIG. 5, a schematic view of a system 100 for an agricultural machine is illustrated in accordance with aspects of the present subject matter. In general, the system 100 will be described herein with reference to the work vehicle 54 and the implement 10 described above with reference to FIGS. 1-4. However, it should be appreciated that the disclosed system 100 may generally be utilized with work vehicles having any suitable vehicle configuration and/or implements 10 have any suitable implement configuration.

In several embodiments, the system 100 may include a computing system 102 and various other components configured to be communicatively coupled to and/or controlled by the computing system 102, such as one or more imaging devices 50 and/or various components of the work vehicle 54 and/or the implement 10. As will be described in greater detail below, the computing system 102 may be configured to receive images or other image data from the imaging devices 50 that depict portions of the field and/or an environment surrounding the implement 10. Based on an analysis of the image data received from the imaging devices 50 and/or other inputs, the system 100 may determine a position of the implement 10 (e.g., the folded position or the unfolded position). Based on the position of the implement 10, the computing system 102 may be configured to operate various imaging devices 50. For instance, when in the operating position, a first imaging device or a first set of imaging devices 50 may be configured to capture image data associated with one or more work-related parameters that relate to the performance of the corresponding agricultural operation within the field, such as one or more field conditions or parameters (e.g., the contour of the ground, surface roughness, rocks/stones, etc.), one or more crop conditions (e.g., distance to the crop canopy, the location of crop rows, residue flow, residue plugs, etc.), and/or monitor an area surrounding the implement 10. Similarly, when operating in the transport position, a second imaging device or a second set of imaging devices 50 may be configured to capture image data associated with one or more transport-related parameters that relate to transporting the implement 10 between separate locations. The transport-related parameters may include environmental feature detection/avoidance, road edge recognition, highway lane detection, and the like.

In general, the computing system 102 may correspond to any suitable processor-based devices, such as a computing device or any combination of computing devices. Thus, as shown in FIG. 5, the computing system 102 may generally include one or more processor(s) 104 and associated memory devices 106 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor(s) 104, including data 108 that can be retrieved, manipulated, created, and/or stored by the processor(s) 104 and instructions 110 that can be executed by the processor(s) 104.

In several embodiments, the data 108 may be stored in one or more databases. For example, the memory 106 may include an image database 112 for storing image data received from the imaging devices 50. For example, the imaging devices 50 may be configured to capture images of the environment surrounding each respective imaging device 50 continuously or periodically. In such embodiments, the images transmitted to the computing system 102 from the imaging devices 50 may be stored within the image database 112 for subsequent processing and/or analysis. It should be appreciated that, as used herein, the term image data may include any suitable type of data received from the imaging devices 50 that allows for the environment within the field of view 52 of the imaging device 50 to be analyzed, including photographs and other image-related data (e.g., scan data and/or the like).

Additionally, as shown in FIG. 5, the memory 106 may include an implement database 114 for storing information related to implement parameters for the implement 10 being used. For example, based on the image data received from the imaging devices 50 and/or other inputs (operator inputs, stored data, and/or remotely received inputs), the implement parameter(s) may be received by the computing system 102. The implement parameter(s) may then be stored within the implement database 114 for subsequent processing and/or analysis.

Moreover, in several embodiments, the memory 106 may also include a location database 116 storing location information about the work vehicle 54 and/or the implement 10 and/or information about the field being processed (e.g., a field map). Specifically, as shown in FIG. 5, the computing system 102 may be communicatively coupled to a positioning devices 118 installed on or within the work vehicle 54 and/or on or within the implement 10. For example, in some embodiments, the positioning devices 118 may be configured to determine the location of the work vehicle 54 and/or the implement 10 using a satellite navigation position system (e.g. a GPS system, a Galileo positioning system, the Global Navigation satellite system (GLONASS), the BeiDou Satellite Navigation and Positioning system, and/or the like). In such embodiments, the location determined by the positioning devices 118 may be transmitted to the computing system 102 (e.g., in the form coordinates) and subsequently stored within the location database 116 for subsequent processing and/or analysis.

Additionally, in several embodiments, the location data stored within the location database 116 may also be correlated to the image data stored within the image database 112. For instance, in several embodiments, the location coordinates derived from the positioning devices 118 and the image(s) captured by the imaging devices 50 may both be time-stamped. In such an embodiment, the time-stamped data may allow each image captured by the imaging devices 50 to be matched or correlated to a corresponding set of location coordinates received from the positioning devices 118, thereby allowing the precise location of the portion of the field depicted within a given image to be known (or at least capable of calculation) by the computing system 102.

Moreover, by matching each image to a corresponding set of location coordinates, the computing system 102 may also be configured to generate or update a corresponding map. For example, in instances in which the computing system 102 already includes a map stored within its memory 106 that includes location coordinates associated with various points, each image captured by the imaging devices 50 may be mapped or correlated to a given location within the field map. Alternatively, based on the location data and the associated image data, the computing system 102 may be configured to generate a map that includes the geo-located images associated therewith.

Referring still to FIG. 5, in several embodiments, the instructions 110 stored within the memory 106 of the computing system 102 may be executed by the processor(s) 104 to implement a position detection module 120. In general, the position detection module 120 may be configured to determine when a change in the operating position of the implement 10 is directed based on inputs received by the computing system 102. For instance, in several embodiments, the position detection module 120 may be configured to determine that the operator desires that the operating position of the agricultural vehicle 54 be switched based on operator inputs received from a user interface 122, such as one or more input devices 124, which may be located within the cab of the agricultural vehicle 54. For example, the operator may provide inputs indicative of a desired change in operating position of the implement 10 (e.g., unfolded position vs. folded position). In such embodiments, based on the received operator input, the position detection module 120 may determine a transition between operating positions should be initiated. Alternatively, the inputs may be received from non-operator-controlled input devices 124, such as a speed sensor or a position sensor. For example, the non-operator-controlled input device may be configured to detect when the speed of the agricultural vehicle 54 exceeds a preset threshold. Upon detecting a speed in excess of the preset threshold, the computing system 102 may determine that the agricultural vehicle 54 has transitioned between operating positions and/or is halted from doing so when the threshold speed is exceeded.

Moreover, as shown in FIG. 5, the instructions 110 stored within the memory 106 may be executed by the processor(s) 104 to implement an image module 126. In general, the image module 126 may be configured to control the operation of each imaging device 50 and/or any related components to provide the desired field-of-view and/or sensor settings based on the current operating position of the agricultural vehicle 54. For instance, as indicated above, in several embodiments, each imaging device 50 may be positioned on a portion of the implement frame 12 that is movable relative to the remaining portions of the frame 12. In such embodiments, the image module 126 may be configured to control the operation of the corresponding imaging device 50 to ensure that each imaging device 50 has the desired field-of-view for the current operating position of the vehicle 54. For example, when transitioning between the unfolded position and the folded position, the computing system 102 may reference the sensor settings database to determine the desired sensor orientation for the new operating position. Similarly, when transitioning between operating positions, the computing system 102 may also be configured to reference the image database 112 to determine if any additional imaging device settings (e.g., power output settings, light sensitivity settings, etc.) should be adjusted to account for the switch between operating positions.

In various embodiments, the image module 126 may also be configured to actuate various imaging devices 50 between an ON state and an OFF state and/or between a use state and a standby state. For example, the computing system 102 may utilize the image data to illustrate the environment surrounding the implement 10 on a display. In some instances, the image data from the imaging devices 50 may be combined to form an expanded view or an aerial view of the implement 10 and/or the agricultural vehicle 54 and/or the surrounding environment. In some instances, the implement 10 may include a first imaging device 50 installed on the movable section 20A, 20B (FIG. 1) of the implement 10 and a second imaging device 50 installed inboard of the movable section 20A, 20B relative to the center frame section 14 (FIG. 1) in the unfolded position. When the implement 10 is in the unfolded position, the image module 126 may utilize image data associated with an imaged environment outward (e.g., laterally, forward, and/or rearward) of the implement 10 from a first imaging device 50 while a second imaging device 50 monitors a ground surface below the implement 10. When the implement 10 is in the folded position, the image module 126 may utilize image data associated with an imaged environment laterally outward (e.g., laterally, forward, and/or rearward) of the implement 10 from a second imaging device 50 while the first imaging device 50 is placed in a standby mode and/or utilized to further monitor a change in position of the implement 10.

Referring still to FIG. 5, the instructions 110 stored within the memory 106 of the computing system 102 may also be executed by the processor(s) 104 to implement a control module 128. In general, the control module 128 may generate information that may be provided to a user interface 122 to view or otherwise receive information corresponding to the implement 10 and/or the surrounding operating environment.

In some examples, the user interface 122 may include a display 130 having a touchscreen 132 mounted within a cockpit module, an instrument cluster, and/or any other location of the vehicle 54. The display 130 may be capable of displaying information related to the implement 10, the surrounding environment, the field, and/or any other information. In some embodiments, the user interface 122 may also include an input device 124 in the form of circuitry 134 within the touchscreen 132 to receive an input corresponding with a location over the display 130. Other forms of input devices 124 include one or more joysticks, digital input pads, or the like that can be used in place or in addition to the touchscreen 132.

In some instances, the control module 128 may generate a composite view of the environment surrounding the implement 10 by combining image data corresponding to two or more of the image devices. In some examples, the computing system 102 may receive image data from the imaging devices 50 and correct any distortion in the image data with a distortion correction module. Distortion in the image data may be the result of lens distortion, viewpoint correction, or any other form of distortion common in imaging devices 50. The information module may also include a view conversion module that may convert the image data to a viewpoint. A viewpoint correction may correspond to altering the orientation of a perspective of the image data corresponding to a field of view 52 of an imaging device 50. For example, the image data may be adjusted from a side view to an aerial view. The image data from each of the two or more imaging devices 50 may then be trimmed and scaled by an image trimming/scaling module and combined. The composite image may form an expanded field of view 52, an aerial view, or any combination of the image data received from the imaging devices 50.

In some implementations, the relative location of the image data received from the two or more imaging devices 50 may further be aligned by an image reference identification module. The image reference identification module may be operable to detect and identify environmental features 146 (FIG. 8) in the image data received from each of the imaging devices 50 and utilize environmental features 146 in different fields of view 52 to align and accurately combine the image data. The control module 128 may further be able to identify occluded and/or missing image data and request satellite image data or other feature data from the positioning devices 118 to further supplement and enhance the composite image data. The resulting enhanced composite image data may then be output to the display 130 for viewing by the user.

In some embodiments, the control module 128 may additionally or alternatively output instructions 110 to a light 136, a horn 138, a speaker 140, and/or a haptic device 142, which may prompt visual, auditory, and tactile notifications and/or warnings based on predefined conditions. The predefined conditions may include an environmental feature 146 within a projected path of the implement 10, an environmental feature 146 within a fold/unfold zone 144 (FIG. 7) of the implement 10, and/or any other condition. For instance, the vehicle lights 136 and/or vehicle emergency flashers may provide a visual alert. The vehicle horn 138 and/or a speaker 140 may provide an audible alert. The haptic device 142 integrated into a steering wheel, a seat, an armrest, and/or any other location may provide a tactile alert.

Referring still to FIG. 5, the control module 128 may also be configured to adjust the operation of the work vehicle 54 and/or the implement 10 by controlling one or more components of the implement 10 and/or the vehicle 54. Specifically, in several embodiments, when the computing system 102 determines that the implement 10 and/or the vehicle 54 may contact an environmental feature 146 based on a projected path and the received image data, the control module 128 may be configured to fine-tune the operation of the work vehicle 54 and/or the implement 10 in a manner designed to avoid contact with the environmental feature 146. For instance, the computing system 102 may be configured to implement various control actions to adjust the operation of the work vehicle 54 and/or the implement 10 in a manner that decreases the likelihood of contact with the environmental feature 146. In some embodiments, the computing system 102 may be configured to increase or decrease the operational or ground speed of the implement 10 to avoid a detected environmental feature 146. For instance, as shown in FIG. 5, the computing system 102 may be communicatively coupled to both the engine 148 and the transmission 150 of the work vehicle 54. In such an embodiment, the computing system 102 may be configured to adjust the operation of the engine 148 and/or the transmission 150 in a manner that increases or decreases the ground speed of the work vehicle 54 and, thus, the ground speed of the implement 10, such as by transmitting suitable control signals for controlling an engine or speed governor associated with the engine 148 and/or transmitting suitable control signals for controlling the engagement/disengagement of one or more clutches provided in operative association with the transmission 150.

In addition to adjusting the ground speed of the vehicle 54 and, consequently, the implement 10 (or as an alternative thereto), the computing system 102 may also be configured to adjust a steering system 152 of the vehicle 54 and/or an operating parameter associated with the implement 10. For instance, as shown in FIG. 5, the computing system 102 may be communicatively coupled with the steering system 152 of the vehicle 54. Additionally or alternatively, as shown in FIG. 5, the computing system 102 may be communicatively coupled to one or more valves 154 configured to regulate the supply of fluid (e.g., hydraulic fluid or air) to the wheel actuators, implement actuators, and/or folding actuators 48 of the implement 10. In such embodiments, by regulating the supply of fluid to the actuator(s), the computing system 102 may automatically adjust the position and/or any other suitable operating parameter associated with the implement 10.

Moreover, as shown in FIG. 5, the computing system 102 may also include a communications interface 156 for the computing system 102 to communicate with any of the various other system components described herein. For instance, one or more communicative links or interfaces 158 (e.g., one or more data buses) may be provided between the communications interface 156 and the imaging devices 50 to allow images transmitted from the imaging devices 50 to be received by the computing system 102. Similarly, one or more communicative links or interfaces 160 (e.g., one or more data buses) may be provided between the communications interface 156 and the positioning devices 118 to allow the location information generated by the positioning devices 118 to be received by the computing system 102. Additionally, one or more communicative links or interfaces 162 (e.g., one or more data buses) may be provided between the communications interface 156 and the user interface 122 to allow the inputs received by the user interface 122 to be received by the computing system 102 and/or to distribute information to the user interface 122.

Additionally, as shown in FIG. 5, one or more communicative links or interfaces 164 (e.g., one or more data buses) may be provided between the communications interface 156 and the engine 148, the transmission 150, the control valves 154, the steering system 152, and/or the like to allow the computing system 102 to control the operation of such system components.

The communications interface 156 may also communicate via wired and/or wireless communication with a remote electronic device 166. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 166 may also include a display 130 for displaying information to a user. For instance, the electronic device 166 may display one or more graphical user interfaces and may be capable of receiving remote inputs to set a position of the implement 10 and/or to input any other information. In addition, the electronic device 166 may provide feedback information, such as visual, audible, and tactile alerts. It will be appreciated that the electronic device 166 may be any one of a variety of computing devices and may include a processor and memory. For example, the electronic device 166 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Referring now to FIGS. 6 and 7, a front view of an agricultural implement 10 in an unfolded position and a folded position are respectively illustrated in accordance with various aspects of the present disclosure. As provided herein, the implement 10 may include a center frame section 14 and a plurality of movable frame sections 16, 18, and 20 that may be foldable relative to the center frame section 14 from the unfolded position (e.g., operating position) to the folded position (e.g., transport position).

As illustrated in FIGS. 6 and 7, in some embodiments, a first imaging device 50-1 is installed on at least one of the movable sections 20A, 20B. The first imaging device 50-1 may be configured to have a field of view 52-1, 52-2 that allows the first imaging device 50-1 to capture images of an adjacent area or portion of a surrounding environment that is disposed in front of, rearwardly of, and/or laterally outward of the implement 10.

Referring still to FIGS. 6 and 7, in some embodiments, a second imaging device 50-2 is installed inboard of the movable section 20A, 20B relative to the center frame section 14 in the unfolded position. However, in some embodiments, the first imaging device 50-1 may be positioned inboard of the second imaging device 50-2 in the folded position. As used herein, a first component is "inboard" of a second component when the first component is positioned between a center axis 170 of the implement 10 and the second component. Conversely, a first component is "outboard" of a second component when the second component is positioned between a center axis 170 of the implement 10 and the first component. In the illustrated embodiments, the second imaging device 50-2 is operably coupled with the inner movable frame section 16A. As illustrated, the implement 10 may include first and second imaging devices 50-1, 50-2 on each side of the center axis 170. It will be appreciated, however, that the implement 10 may include any number of imaging devices 50-1, 50-2 positioned in any location without departing from the scope of the present disclosure.

As illustrated, each of the first and second imaging devices 50-1, 50-2 is communicatively coupled with a computing system 102. In some instances, the computing system 102 may be configured to determine whether the implement 10 is in the folded position or the unfolded position. In various embodiments, the computing system 102 may determine whether the implement 10 is in the folded position or the unfolded position based on information provided from the movement system 46, the first and second imaging devices 50-1, 50-2, an input, and/or through any other practicable assembly. For example, the movement system 46 may provide the computing system 102 a fold actuator state, which may be indicative of an implement position.

Additionally or alternatively, the computing system 102 may be configured to determine whether the implement 10, and/or the movable frame section 20A, 20B, is in the unfolded position or the folded position based on the image data received from the first imaging device 50-1 (or the second imaging device 50-2). For example, in several embodiments, the computing system 102 may be configured to receive and process the images captured by the first imaging device 50-1 to allow features within the imaged portions of the field to be determined. For instance, the computing system 102 may be configured to execute one or more suitable image processing algorithms for detecting the presence of soil within the image. For instance, when in the unfolded position, the first imaging device 50-1 is generally positioned to capture a field of view 52-1, 52-2 that allows the first imaging device 50-1 to capture images of an adjacent area or portion of a surrounding environment that is disposed in front of, rearwardly of, and/or laterally outward of the implement 10, which will include some of a ground surface proximate to the implement 10. Conversely, when in the folded position, the first imaging device 50-1 may be positioned between the center axis 170 and another portion of the frame 12 obscuring the first imaging device 50-1 from capturing images of a ground surface. For example, in the illustrated examples of FIG. 7, the first imaging device 50-1 may be positioned between the center axis 170 and the inner movable frame sections 16B. In some examples, the computing system 102 may compare a number of pixels indicative of a ground surface to a threshold. If the number of pixels exceeds the threshold, the computing system 102 may determine that the implement 10 is in the unfolded position. Conversely, if the number of pixels does not exceed the threshold, the computing system 102 may determine that the implement 10 is in the folded position.

In some embodiments, when the implement 10 is in the unfolded position, the computing system 102 may receive image data associated with an imaged environment outward (e.g., laterally, forward, and/or rearward) of the implement 10 from the first imaging device 50-1. When the implement 10 is in the folded position, the computing system 102 may receive image data associated with the imaged environment outward (e.g., laterally, forward, and/or rearward) of the implement 10 from the second imaging device 50-2 as the first imaging device 50-1 may be obstructed by various components of the implement 10.

In some embodiments, the second imaging device 50-2 may be configured to capture image data of a fold/unfold zone 144, which may be an area adjacent to the implement 10 for which the implement 10 would extend into when the implement 10 is moved from the folded position to the unfolded position. In various embodiments, the second imaging device 50-2 may provide image data of the fold/unfold zone 144 and any environmental feature 146 within the zone and/or within a predefined distance of the fold/unfold zone 144. When the implement 10 is to be moved from the folded position to the unfolded position, the computing system 102 may verify that the fold/unfold zone 144 is free of environmental features 146. When an environmental feature 146 is present within the fold/unfold zone 144, a notification may be provided to a user interface 122 and/or a remote electronic device 166. Additionally or alternatively, the computing system 102 may prevent movement of the implement 10 between the folded and the unfolded position, or vice versa, if an environmental feature 146 is detected.

Referring now to FIGS. 8A-9B, in various embodiments, an aerial view of the vehicle 54 (FIG. 5) and the implement 10 is illustrated on the display 130, which may be within the cab of the vehicle 54, on a remote electronic device 166 and/or any other practicable location. In some embodiments, a plurality of images captured by the various imaging devices 50-1, 50-2 of the disclosed system 100 may collectively depict an environment surrounding the implement 10. For instance, the field of view 52-1, 52-2 of the imaging devices 50-1, 50-2 may allow the imaging devices 50-1, 50-2 to capture an image of the environment that spans a given distance having a width that is generally greater than the implement 10 in the unfolded and/or the folded position. In such embodiments, multiple images may be stitched together or otherwise analyzed in combination. For instance, in the example view shown in FIGS. 8A-9B, a plurality of images captured by one of the imaging devices 50-1, 50-2 have been stitched together to provide a view of the environment surrounding the implement 10.

It should be appreciated that the computing system 102 (e.g., the image module 126) may be configured to identify which images can be used to collectively depict a continuous section of the surrounding environment using any suitable methodology or technique. For instance, as indicated above, the images provided by the imaging devices 50-1, 50-2 may be time-stamped. In such an embodiment, by knowing the ground speed of the implement 10 and the field of view 52-1, 52-2 of the imaging devices 50-1, 50-2, the computing system 102 may be configured to stitch together or otherwise access the images captured by the imaging devices 50-1, 50-2 that collectively depict a continuous surrounding environment. Alternatively, the computing system 102 may be configured to utilize any suitable image-processing algorithm that allows the computing system 102 to identify the images (or portions of images) that collectively depict a continuous surrounding environment.

In several embodiments, a vehicle model 172 of the vehicle 54 and an implement model 174 of the implement 10 may be incorporated into the aerial view by the computing system 102 as sample image data and/or rendered graphics. The sample image data may include stock images of the vehicle 54 and a library of implement images that may be incorporated in the aerial view to demonstrate the proportions and position of the vehicle 54 relative to the implement 10. In some implementations, the vehicle operator may input the dimensions of the implement 10 via the input device(s) 124. The computing system 102 may also be operable to estimate the dimensions of the implement 10 based on known relationships of the positions of each of the imaging devices 50-1, 50-2. For example, the computing system 102 may be operable to detect the implement 10 in the image data with an image reference identification module. Based on the known relationships of the positions of the imaging devices 50-1, 50-2 and the corresponding fields of view 52-1, 52-2, the computing system 102 may be operable to determine the proportions, approximate dimensions, and shape of the implement 10 to generate the implement model 174.

The computing system 102 may further utilize a hitch angle $\gamma$ to process and compare image data of the implement 10 in different positions relative to the vehicle 54 to gain additional image data to determine the proportions, approximate dimensions, and shape of the implement 10. The hitch angle $\gamma$ may further be utilized by the computing system 102 to display the implement model 174 relative to the vehicle model 172 at the corresponding hitch angle $\gamma$. By demonstrating the vehicle model 172 and the implement model 174, the computing system 102 may provide useful information to the operator of the vehicle 54. In some implementations, a graphic outline simulating the implement 10 may also be included in the image data displayed on the screen 86 for a reference to the operator of the vehicle 54 to demonstrate the position of the implement model 174 relative to the vehicle model 172 and an operating environment model 176. Based on the determined proportions, approximate dimensions, and shape of the implement 10, the computing system 102 may automatically select a trailer graphic or a stock image of an implement model 174 from a library of trailer images or graphics via the memory 106.

In various embodiments, a plurality of environmental features 146 may also be displayed on the screen by the computing system 102. The environmental features 146 may be incorporated in the image data displayed on the screen 86 to demonstrate a location of the environmental features 146 relative to the vehicle model 172 and the implement model 174. The locations of the environmental features 146 may be extrapolated from the composite image data captured by the imaging devices 50-1, 50-2. Each of the environmental features 146 may be identified based on one or more feature identification algorithms configured to identify various natural and man-made features that may obstruct the path of the implement 10. Additionally or alternatively, sensors and/or radar may be used for detecting environmental features 146 that may be in the path of the implement 10.

The environmental features 146 may be identified and incorporated in the aerial view based on image data, satellite image data, and any other data corresponding to the position and heading of the implement 10. Based on the position and heading of the implement 10, the environmental features 146 may be added to the composite image data and located on the screen 86 relative to the vehicle model 172 and the implement model 174 by utilizing global positions of each of the environmental features 146. The location of the environmental features 146 may be determined by the computing system 102 from the position devices. By enhancing the aerial view with satellite image data, the computing system 102 may provide additional information that may be used in addition to the information identified from the imaging devices 50-1, 50-2. In some implementations, satellite image data may further be utilized by the computing system 102 to provide information corresponding to a region that may be occluded from the fields of view 52-1, 52-2 of the imaging devices 50-1, 50-2.

Figure 8A:
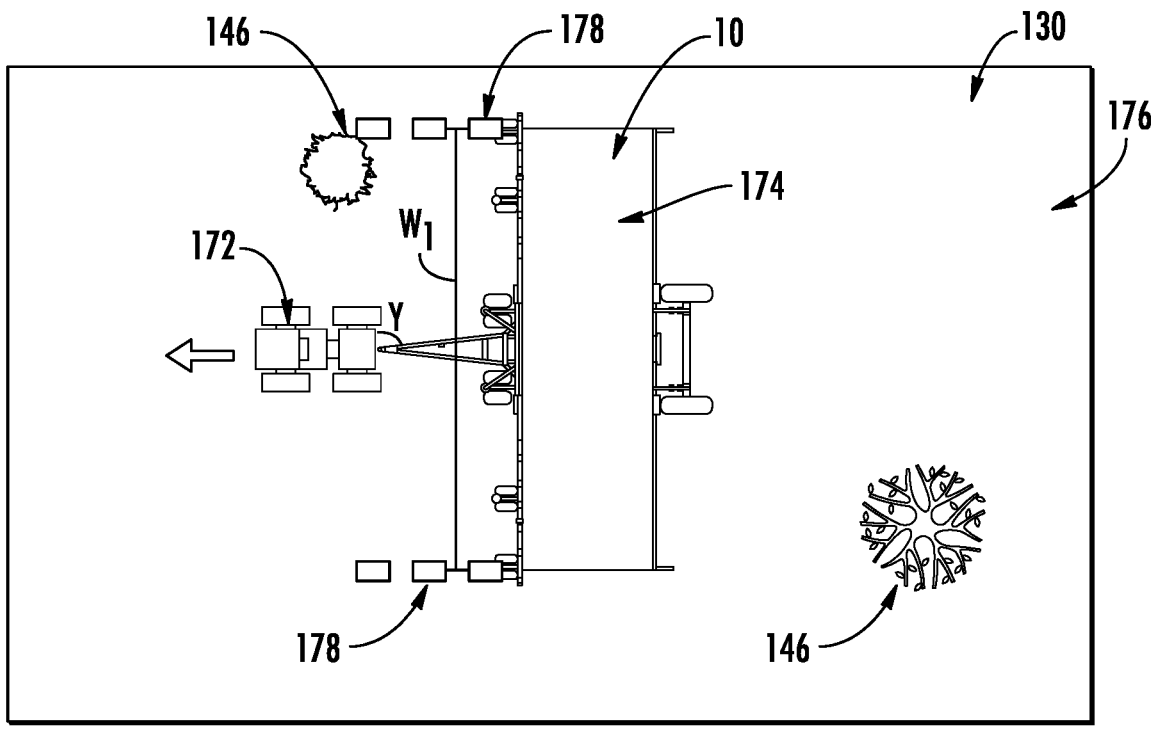
FIG. 8A illustrates an aerial view of an agricultural vehicle and the implement in the unfolded position illustrated on a display in accordance with aspects of the present subject matter.
Figure 8B:
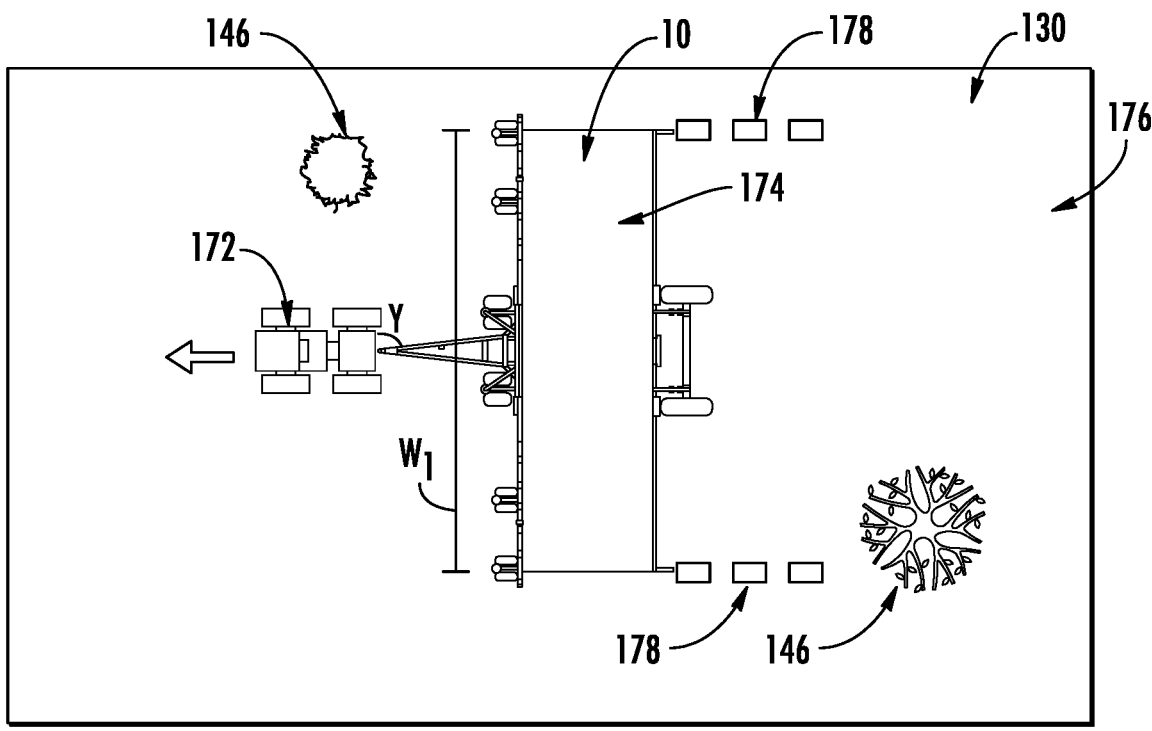
FIG. 8B illustrates an aerial view of an agricultural vehicle and the implement in the unfolded position illustrated on a display in accordance with aspects of the present subject matter.
Figure 9A:
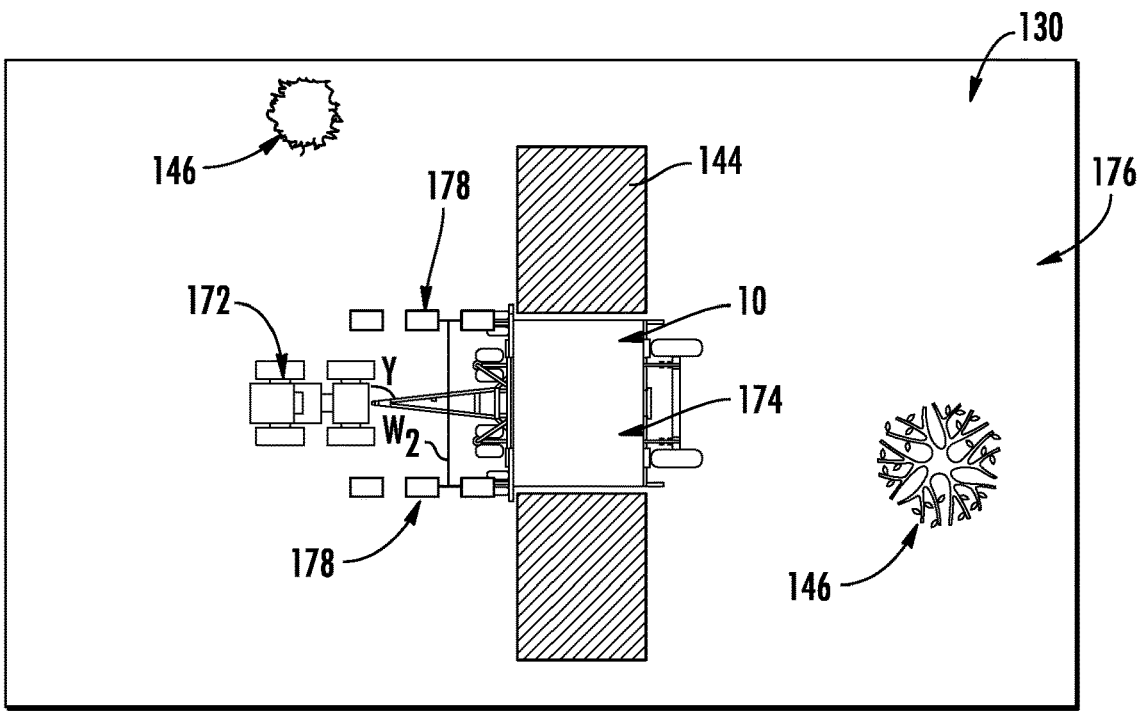
FIG. 9A illustrates an aerial view of an agricultural vehicle and the implement in the folded position illustrated on a display in accordance with aspects of the present subject matter.
Figure 9B:
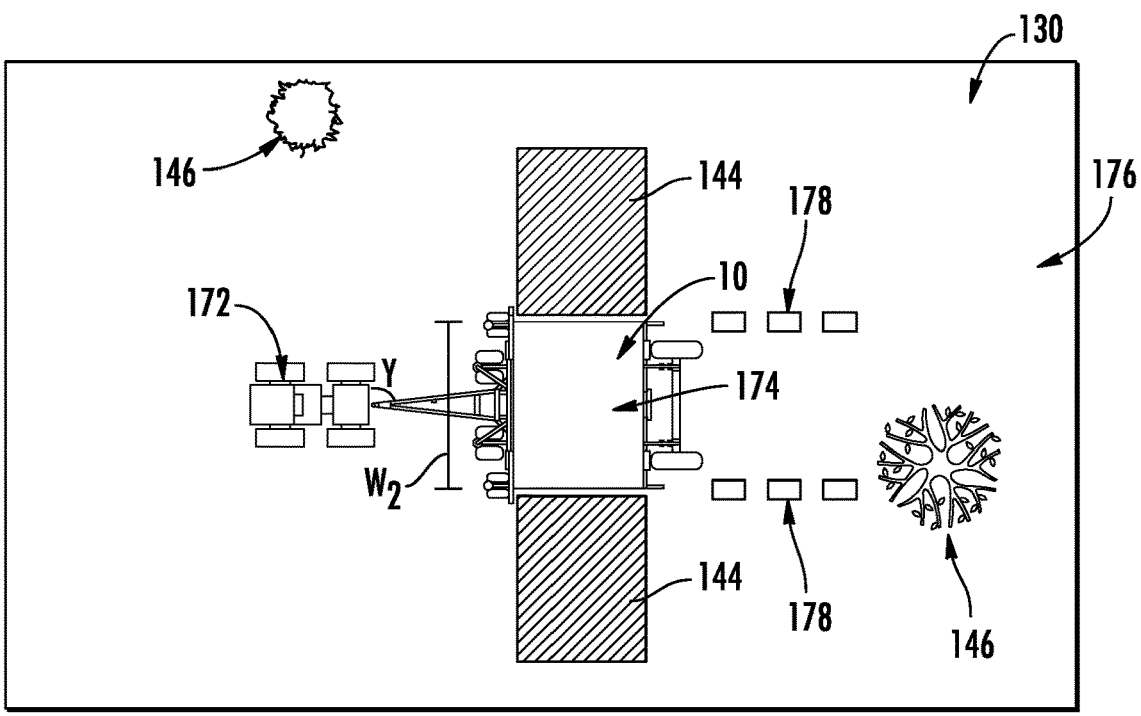
FIG. 9B illustrates an aerial view of an agricultural vehicle and the implement in the folded position illustrated on a display in accordance with aspects of the present subject matter.

Referring further to FIGS. 8A-9B, in various instances, the implement model 174 may be updated based on the position of the implement 10. For example, as illustrated in FIGS. 8A and 8B, the implement model 174 may include an unfolded model when the implement 10 is in the unfolded position. The unfolded model may have a first width $w_1$ that is generally commensurate with the unfolded width of the implement 10 relative to the width of the vehicle 54. As illustrated in FIGS. 9A and 9B, the implement model 174 may include a folded model when the implement 10 is in the folded position. The folded model may have a second width $w_2$ that is generally commensurate with the folded width of the implement 10 relative to the width of the vehicle 54. In general, the second width $w_2$ may be less than the first width $w_1$.

In various embodiments, the computing system 102 may be configured to determine whether an environmental feature 146 is within a path of the implement 10. If an environmental feature 146 is within the path of the implement 10, the computing system 102 may generate a warning indicating a presence of the environmental feature 146. Further, in several embodiments, the computing system 102 may consider the position of the implement 10 when determined whether an environmental feature 146 is within the path. For example, as illustrated in FIG. 8A, an environmental feature 146 forwardly of the implement 10 may be within the path of the implement 10 when the implement 10 is in the unfolded position. However, as illustrated in FIG. 9A, the same environmental feature 146 forwardly of the implement 10 may not be within the path of the implement 10 when the implement 10 is in the folded position.

Referring further to FIGS. 8A-9B, in various embodiments, an overlay is presented on the display 130 in the form of static and/or dynamic locus lines 178 to aid in maneuvering the implement 10 to a target and/or avoid various environmental features 146. In some examples, based on a steering wheel angle and the image data provided by the imaging devices 50-1, 50-2, along with other vehicle data, including the gear ratio, wheelbase size, wheel radius, and vehicle speed data, the computing system 102 may generate a proper size and direction for one or more locus lines 178 to be displayed as an overlay on the display 130.

The locus lines 178 may be static such that the locus lines 178 are based on the heading of the vehicle 54 and/or dynamically altered based on a movement direction of the work vehicle 54 as detected by a steering system 152 in response to a change in the steering wheel angle and other vehicle data related to the wheelbase, radius, and gear ratio. Each step of calculating dynamic locus lines 178 depends on the turning radius and the current steering wheel angle of the vehicle 54, so the locus lines 178 will change as the steering wheel angle is changed. As the steering wheel is rotated, each step and direction the steering wheel moves is reflected in the locus line 178 direction as displayed. Each time the steering angle changes, a replacement set of dynamic locus lines 178 may be displayed. In this respect, the dynamic locus lines 178 display a true path of the implement 10 attached to the vehicle 54 so that the vehicle operator gets a true sense of where the implement 10 is headed as the implement 10 is in motion.

As illustrated in FIGS. 8A and 9A, in some instances, the display 130 can illustrate one or more locus lines 178 forwardly of the implement 10 when a work vehicle 54 coupled with the implement 10 is in a first transmission state, such as a transmission state that causes the vehicle 54 to move in a forward direction. In addition, as illustrated in FIGS. 8B and 9B, in some instances, the display 130 can illustrate one or more locus lines 178 rearwardly of the implement 10 when the work vehicle 54 coupled with the implement 10 is in a second transmission state, such as a transmission state that causes the vehicle 54 to move in a rearward direction.

Figure 10:
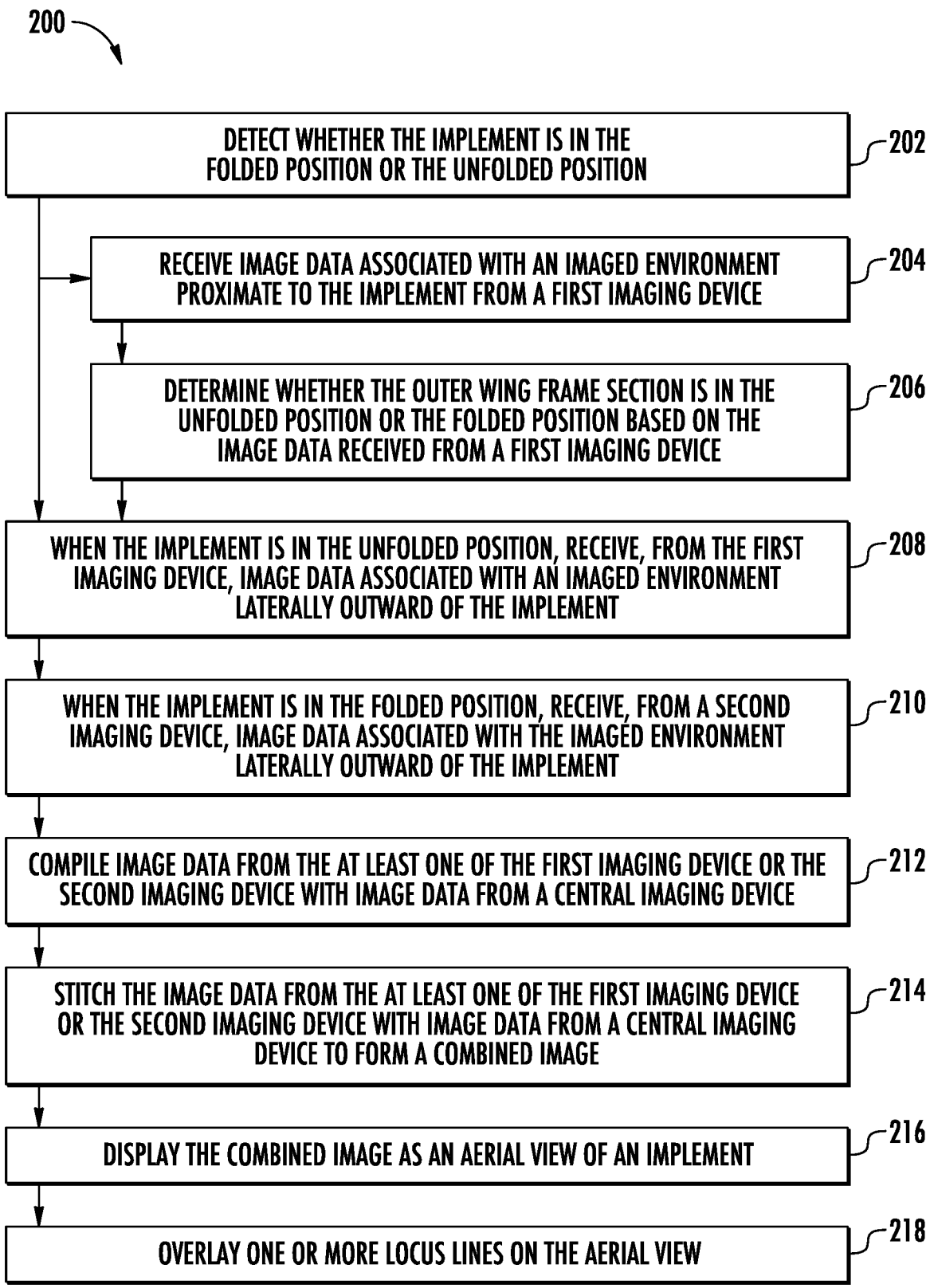
FIG. 10 illustrates a flow diagram of a method of generating an image of an implement in accordance with aspects of the present subject matter.

Referring now to FIG. 10, a flow diagram of a method 200 for collecting data associated with the operation of an agricultural vehicle in different operating positions is illustrated in accordance with aspects of the present subject matter. In general, the method 200 will be described herein with reference to the embodiments of the multimodal sensing system 100 shown in FIGS. 1-9B. Although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and-or adapted in various ways without deviating from the scope of the present disclosure.

As shown in FIG. 9, at (202), the method 200 may include detecting whether the implement is in the folded position or the unfolded position. In various embodiments, the computing system may detect whether the implement is in the folded position or the unfolded position based on information provided from the movement system, the first and second imaging devices, an input, and/or through any other practicable assembly. For example, the movement system may provide the computing system a fold actuator state, which may be indicative of an implement position.

At (204), the method may include receiving image data associated with an imaged environment proximate to the implement from a first imaging device. At (206), the method 200 may include determining whether the movable frame section is in the unfolded position or the folded position based on the image data received from the first imaging device. In some instances, the computing system is configured to determine that the movable frame section is in the unfolded position by detecting a ground surface within the image data provided by the first imaging device. Additionally or alternatively, the computing system is configured to determine that the movable frame section is in the folded position by detecting additional components of the implement within the image data provided by the first imaging device. In some examples, the computing system may compare a number of pixels indicative of a ground surface to a threshold. If the number of pixels exceeds the threshold, the computing system may determine that the implement is in the unfolded position. Conversely, if the number of pixels does not exceed the threshold, the computing system may determine that the implement is in the folded position.

When the implement is in the unfolded position, at (208), the method 200 can include receiving, from the first imaging device, image data associated with an imaged environment outward (e.g., laterally, forward, and/or rearward) of the implement. Conversely, when the implement is in the folded position, at step (210), the method 200 can include receiving, from a second imaging device, image data associated with the imaged environment outward of the implement. As provided herein, the second imaging device may be positioned inboard of the first imaging device in the unfolded position. Further, the second imaging device can have a focal axis that is generally directed towards a ground surface below the implement in the unfolded position and outward of the implement in the folded position.

At (212), the method 200 can include compiling image data from the at least one of the first imaging device or the second imaging device with image data from a central imaging device. The central imaging device may be coupled with a central frame section of the implement. In various embodiments, as the central frame section is maintained in a generally common position in both the unfolded and folded positions, the central imaging device may be utilized in both positions.

At (214), the method 200 can include stitching the image data from the at least one of the first imaging device or the second imaging device with image data from a central imaging device to form a combined image. At (216), the method 200 can include displaying the combined image as an aerial view of an implement. In addition, at (218), the method can include overlaying one or more locus lines on the aerial view of the implement.

It is to be understood that the steps of method 200 are performed by a computing system (e.g., computing system 102) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as the method 200, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as environmental feature code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for an agricultural application, the system comprising:
    an implement including a frame, the frame including a center frame section and at least one movable frame section;
    a movement system configured to pivot the at least one movable frame section relative to the center frame section between a folded position and an unfolded position;
    a first imaging device installed on the at least one movable frame section;
    a second imaging device installed on the at least one movable frame section inboard of the at least one movable section relative to the center frame section in the unfolded position; and
    a computing system communicatively coupled to the first imaging device and the second imaging device, the computing system including a processor and associated memory, the memory storing instructions that, when implemented by the processor, configure the computing system to:
    when the implement is in the unfolded position, receive, from the first imaging device, image data associated with an imaged environment laterally outward of the implement; and
    when the implement is in the folded position, receive, from the second imaging device, image data associated with the imaged environment laterally outward of the implement.

2. The system of claim 1, wherein the computing system is further configured to generate an aerial view of at least a portion of the implement from the image data received from at least one of the first imaging device or the second imaging device.

3. The system of claim 2, further comprising: a display for displaying the aerial view, the aerial view further displaying environmental features proximate to the implement.

4. The system of claim 3, wherein the computing system is further configured to determine whether an environmental feature is within a path of the implement and generate a warning indicating a presence of the environmental feature.

5. The system of claim 1, wherein the second imaging device is outboard of the first imaging device in the folded position.

6. The system of claim 3, wherein the display illustrates an implement model, the implement model including an unfolded model when the implement is in the unfolded position and a folded model when the implement is in the folded position.

7. The system of claim 3, wherein the display illustrates one or more locus lines forwardly of the implement when a work vehicle coupled with the implement is in a first transmission state and the one or more locus lines rearwardly of the implement when the work vehicle coupled with the implement is in a second transmission state.

8. The system of claim 7, wherein the one or more locus lines are dynamically altered based on a movement direction of the work vehicle as detected by a steering system of the work vehicle.

9. The system of claim 3, wherein the display illustrates a fold/unfold zone proximate to the implement when the implement is to be moved from the folded position to the unfolded position, and wherein the movement system is halted if an environmental feature is detected within the fold/unfold zone.

10. The system of claim 1, further comprising: a user interface, wherein the computing system is configured to monitor a fold/unfold zone proximate to the implement when the implement is to be moved from the folded position to the unfolded position, and wherein a notification is provided through the user interface when an environmental feature is detected within the fold/unfold zone.

11. The system of claim 10, wherein the environmental feature is detected based on the image data provided by the second imaging device.

12. The system of claim 1, wherein the computing system is configured to determine whether the at least one movable frame section is in the unfolded position or the folded position based on the image data received from the first imaging device.

13. A method of generating an image of an implement, the implement including a frame having a center frame section and at least one movable frame section pivotable relative to the center frame section between a folded position and an unfolded position, the method comprising:
  detecting, with a computing system, whether the implement is in the folded position or the unfolded position;
  when the implement is in the unfolded position, receiving, from a first imaging device installed on the at least one movable frame section, image data associated with an imaged environment outward of the implement; and
  when the implement is in the folded position, receiving, from a second imaging device installed on the at least one movable frame section, image data associated with the imaged environment outward of the implement, the second imaging device positioned inboard of the first imaging device in the unfolded position.

14. The method of claim 13, wherein the second imaging device has a focal axis that is generally directed towards a ground surface below the implement in the unfolded position and outward of the implement in the folded position.

15. The method of claim 13, wherein detecting whether the implement is in the folded position or the unfolded position further comprises: receiving, from a first imaging device, image data associated with an imaged environment proximate to the implement; and determining, with the computing system, whether the at least one movable frame section is in the unfolded position or the folded position based on the image data received from the first imaging device.

16. The method of claim 15, wherein the computing system is configured to determine that the at least one movable frame section is in the unfolded position by detecting a ground surface within the image data provided by the first imaging device.

17. The method of claim 15, wherein the computing system is configured to determine that the at least one movable frame section is in the folded position by detecting additional components of the implement within the image data provided by the first imaging device.

18. A method of generating an image of an implement, the implement including a frame having a center frame section and at least one movable frame section pivotable relative to the center frame section between a folded position and an unfolded position, the method comprising:
  receiving, from a first imaging device installed on the at least one movable frame section, image data associated with an imaged environment proximate to the implement;
  determining, with a computing system, whether the at least one movable frame section is in the unfolded position or the folded position based on the image data received from the first imaging device;
  when the implement is in the unfolded position, receiving, from a first imaging device, image data associated with an imaged environment outward of the implement; and
  when the implement is in the folded position, receiving, from a second imaging device installed on the least one movable frame section, image data associated with the imaged environment outward of the implement, the second imaging device positioned inboard of the first imaging device in the unfolded position.

19. The method of claim 18, further comprising:
  compiling image data from the at least one of the first imaging device or the second imaging device with image data from a central imaging device;
  stitching, with the computing system, the image data from the at least one of the first imaging device or the second imaging device with image data from a central imaging device to form a combined image; and displaying the combined image as an aerial view of an implement.

20. The method of claim 19, further comprising: overlaying one or more locus lines on the aerial view.

* * * * *